United States Patent [19]

Wada

[11] 3,921,216

[45] Nov. 18, 1975

[54] HEAD TRACK CHANGE AND CARTRIDGE EJECT UTILIZING CAPSTAN DRIVE

[75] Inventor: Shoji Wada, Kyoto, Japan

[73] Assignee: Mitsubishi Denki Kabushiki Kaisha, Tokyo, Japan; JA

[22] Filed: Feb. 2, 1973

[21] Appl. No.: 329,015

[30] Foreign Application Priority Data

Feb. 3, 1972 Japan .......... 47-12390
Mar. 28, 1972 Japan .......... 47-31044

[52] U.S. Cl. .......... 360/106; 360/78; 360/92; 360/93

[51] Int. Cl. .. G11b 5/55; G11b 21/08; G11b 15/18

[58] Field of Search .......... 360/78, 92, 105, 106, 93, 360/71

[56] References Cited

UNITED STATES PATENTS

| | | | |
|---|---|---|---|
| 3,109,898 | 11/1963 | Gray | 360/92 |
| 3,247,328 | 4/1966 | Mitchell et al. | 360/92 |
| 3,350,589 | 1/1975 | Tozawa | 360/78 |
| 3,504,916 | 4/1970 | Ban | 360/106 |
| 3,575,422 | 4/1971 | Peltz et al. | 360/78 |
| 3,628,797 | 12/1971 | Ban | 360/92 |
| 3,632,115 | 1/1972 | Ban | 360/92 |
| 3,643,962 | 2/1972 | White et al. | 360/106 |
| 3,781,018 | 12/1973 | Cayton | 360/106 |
| 3,821,814 | 6/1974 | Gordon et al. | 360/106 |

*Primary Examiner*—Bernard Konick
*Assistant Examiner*—R. S. Tupper
*Attorney, Agent, or Firm*—Oblon, Fisher, Spivak, McClelland & Maier

[57] ABSTRACT

A cartridge type tape player for progressively and continuously reproducing a plurality of programs and information of a particular cartridge and/or particular programs of a plurality of cartridges. The tape player comprises at least one cartridge and a control means for controlling the position of the cartridge relative to a corresponding reproducing head. The control means is driven by a pinion of a capstan shaft used for moving the tape of the cartridge. The control means comprises two parts wherein the first part of the control means alters the position of the reproducing head relative to the cartridge and the second part of the control means shifts one of the plurality of cartridges to a reproducing position relative to the corresponding reproducing head.

10 Claims, 9 Drawing Figures

HEAD TRACK CHANGE AND CARTRIDGE EJECT UTILIZING CAPSTAN DRIVE

BACKGROUND OF THE INVENTION

1. Field of the Invention

This invention relates generally to a cartridge type tape player, and more particularly to a cartridge type tape player for progressively and continuously reproducing a plurality of programs and information of a particular cartridge and/or particular programs and information of a plurality of cartridges.

2. Description of the Prior Art

Cartridge type tape players having the function of progressively and continuously reproducing a plurality of programs upon tape within the cartridge have of course been known. The tape player has a reproducing head which is shiftable relative to the tape and a control means for shifting the reproducing head. The control means is actuated by means of a detector for detecting the fact that the reproduction of a certain program has been completed whereby the reproducing head is shifted to a position for reproducing the next program.

The control means has heretofore been a combination of a stepped cam, a ratchet mechanism, and an electromagnetic device. The stepped cam is provided to shift the reproducing head by rotation of the cam, while the electromagnetic device is provided so as to be actuated by the detector and thereby rotate the stepped cam through the ratchet mechanism.

In such known control means, it has been necessary to rotate the stepped cam at an angle sufficient to completely shift the position of the reproducing head. Accordingly, a long-stroke plunger of the electromagnetic device has been required, as well as an electromagnetic device generating a high power. Consequently, there have been disadvantages with prior art devices which, for example, require a large size electromagnetic device which in turn enlarges the size of the tape player, as well as necessitating a large energy consumption by means of the electromagnetic device.

SUMMARY OF THE INVENTION

Accordingly, it is an object of the present invention to provide a novel cartridge type tape player having an improved control mechanism which can be operated by a small sized electromagnetic device characterized by a small energy consumption.

Another object of the present invention is to provide a novel cartridge type tape player for progressively and continuously reproducing programs of a plurality of cartridges, without necessitating a manual operation for interchanging cartridges, by utilizing an improved control mechanism.

The first object of this invention can be attained by providing a cartridge type tape player which comprises a control mechanism driven by a capstan shaft used for moving the tape of the cartridge, the control mechanism being driven by the capstan shaft through a control element only when such is desired. It is possible to use a small sized electromagnetic device characterized by a small energy consumption which is sufficient to control the interconnection between the control mechanism and the capstan shaft, even though the electromagnetic device is utilized within the forms part of the control mechanism.

The second object of this invention is to overcome the disadvantages of conventional tape players wherein a change of cartridges must be made manually each time for reproducing programs of a plurality of cartridges, as the conventional tape players reproduce programs by insertion of a single cartridge only. Accordingly, since two tracks comprise a program, only four programs can be reproduced using one cartridge having 8 tracks. Consequently, numerous changes of cartridges are required for continuously reproducing programs over an extended period of time. Such troublesome changing operations may be dangerous if the operation is carried out by a driver during a driving operation, such as for example, when the tape player is installed within a car.

The second object of the invention can be attained by using a control mechanism driven by the capstan shaft through a control element for a required period of time, the control mechanism being provided for progressively shifting a plurality of cartridges to a reproducing position relative to a reproducing head so as to eliminate the manual operation normally required for interchanging the cartridges.

The cartridge type tape player constructed according to this invention comprises a control means for controlling the relative position of a cartridge and a corresponding reproducing head which is driven by a capstan shaft. The control means comprises a capstan shaft and a control element for controlling the interconnection of the capstan shaft and the control means so that the control means is driven only when required.

In detail, the cartridge type tape player constructed according to this invention comprises a first control means and/or a second control means. The first control means is provided so as to shift the reproducing head relative to the cartridge and is effective for progressively and continuously reproducing a plurality of the programs recorded upon the tape within the cartridge. The second control means is provided so as to progressively shift a plurality of the cartridges to the corresponding reproducing positions, and is effective for progressively and continuously reproducing the information recorded upon a plurality of cartridges. The tape player having the first and second means can progressively and continuously reproduce the information of a plurality of cartridges by progressively reproducing a plurality of programs upon each tape within the cartridges.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENT

Figure 1:
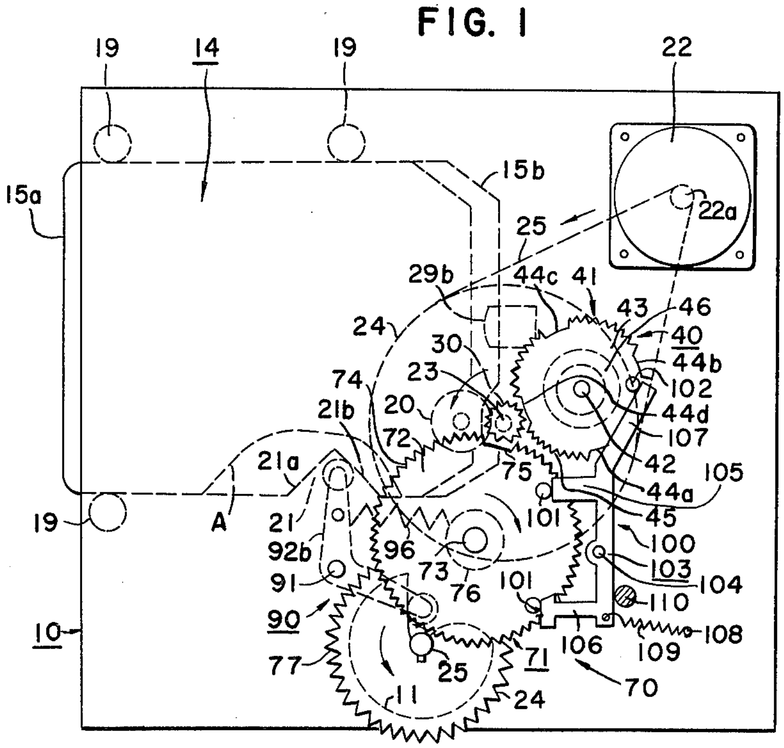
FIG. 1 is a plan view of the tape player constructed according to the present invention.

Referring now to the drawings, and more particularly to FIG. 1 thereof, the tape player includes a main body, generally indicated by the reference character 10, and a first and second control means, generally indicated by the reference characters 40 and 70, respectively. The first control means 40 is provided in order to shift the reproducing head while the second control means 70 is provided in order to shift the cartridge. While the player is illustrated as including both the first and second control means, it is possible to omit one of the control means.

Figure 3:
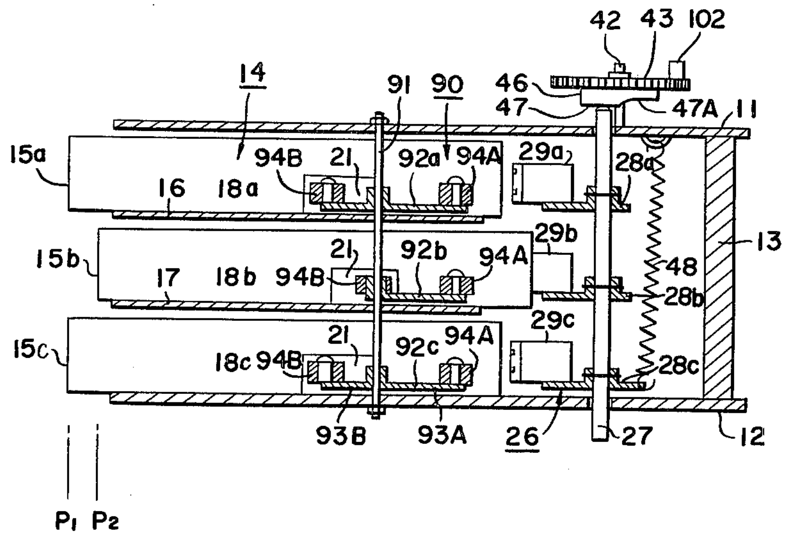
FIG. 3 is a side elevation view of the tape player showing the operation of the head assembly and the second control means of FIG. 2.
Figure 4:
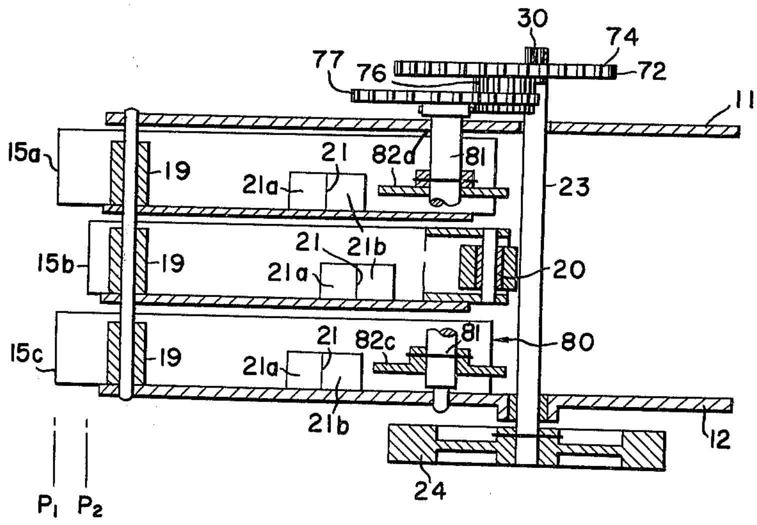
FIG. 4 is a side elevation view of the cam mechanism of the second control means of FIG. 2.

The specific structure of the main body 10 is illustrated with particular reference to FIGS. 1, 3 and 4. The main body includes a pair of parallel plates 11 and 12 which are connected to each other by means of a spacer 13. A cartridge case, generally indicated by the reference character 14, is interposed between the plates 11 and 12 for housing a plurality of cartridges 15*a*, 15*b*, and 15*c*. In the instance that the second control means 70 is not employed, it is sufficient that the structure house a single cartridge, and accordingly, the case 14 may be modified so as to have one cartridge chamber. In addition, while the number of cartridges is not limited to three, the player is most efficient and most economical when the number of cartridges does not exceed five.

In order to house the cartridges, shelves 16 and 17 are mounted within the case 14 in parallel relation to plates 11 and 12, by suitable fastening means, not shown, so as to form therewith three chambers 18*a*, 18*b* and 18*c*. The chamber 18*a* is of course formed between the plates 11 and 16, the chamber 18*b* is similarly formed between the plates 16 and 17, and the chamber 18*c* is formed between the plates 17 and 12, the cartridges 15*a*, 15*b* and 15*c* being respectively inserted within the chambers 18*a*, 18*b* and 18*c*.

The lower surface of each of the cartridges 15*a*, 15*b* and 15*c* slidably contacts one of the plates 16, 17 and 12, respectively, so as to define a first contact plane. Similarly, guide rollers 19, provided on both sides of each cartridge as shown in FIG. 1, slidably contact the side surfaces of each of the cartridges 15*a*, 15*b* and 15*c* so as to respectively define second contact planes which are perpendicular to the first contact plane. Each of the cartridges 15*a*, 15*b*, and 15*c*, are of the same configuration, and of course each contains an endless magnetic tape. The tape may be eight track tape which records four programs of information utilizing two tracks per program, the first program being reproduced within the first and fifth tracks, the second program being reproduced within the second and sixth tracks, the third program being reproduced within the third and seventh tracks, and the fourth program being reproduced within the fourth and eighth tracks.

Pinch rollers 20 are mounted within the cartridges at that end of each cartridge which is first inserted, as is known. Moreover, a V-shaped cavity 21 is formed upon one of the side surfaces of each cartridge and includes a pair of contact surfaces 21*a* and 21*b*, while a drive motor 22 is secured upon one corner of the plate 11, the rotary shaft 22*a* of the motor 22 projecting through the plate 12. In FIG. 1, the part A of the cartridge 15*a* is broken away so as to disclose the cavity 21 of cartridge 15*b* which is below cartridge 15*a*. A capstan shaft 23 similarly extends through a central portion of each of the plates 11 and 12 and is situated with respect to the cartridges 15*a*, 15*b* and 15*c* such that it faces the pinch rollers 20. A fly-wheel 24 is mounted upon the lower end of the capstan shaft 23 below the plate 12 and is drivingly connected to the rotary shaft 22*a* of the motor 22 by means of a belt 25, whereby the fly-wheel 24 is driven in a counterclockwise direction at a constant rotary speed, as shown by the arrow in FIG. 1.

The main body structure 10 further comprises a head assembly generally indicated by the reference character 26, which is clearly shown in FIG. 3. The head assembly has a head connecting shaft 27 which also projects through the plates 11 and 12 and which extends parallel to the capstan shaft 23, the shaft 27 being so disposed as to be movable in the axial direction. Upon the head connecting shaft 27 there is disposed three head connecting elements 28*a*, 28*b* and 28*c* which are axially spaced from each other and are respectively connected to three reproducing heads 29*a*, 29*b* and 29*c* which respectively face the cartridges 15*a*, 15*b* and 15*c*. Consequently, when one cartridge is employed, only one reproducing head is employed, and when five cartridges are inserted within the system, five reproducing heads are utilized. Each of the reproducing heads 29*a*, 29*b* and 29*c* has two pick-up portions for reproducing two channels.

The cartridges 15*a*, 15*b* and 15*c* are respectively mounted so as to be movable between first and second inserted positions $P_1$ and $P_2$, as seen in FIGS. 3 and 4. The first position $P_1$ is a non-reproducing position and the second position $P_2$ is a reproducing position. When the cartridges are respectively in the first position $P_1$, the cartridges are separated from the capstan shaft 23 and the corresponding reproducing heads 29*a*, 29*b* and 29*c*. When, however, the cartridges are respectively shifted to the second position $P_2$ the pinch roller 20 is moved into contact with the capstan shaft 23 whereby the tape is held therebetween so as to travel to, and approach and contact the corresponding reproducing heads 29*a*, 29*b* and 29*c*. As is shown in FIGS. 1, 3 and 4, cartridge 15*b* has been shifted to the second position $P_2$, and consequently, the information contained upon the tape within cartridge 15*b* is reproduced.

The reproducing heads 29*a*, 29*b* and 29*c* are shifted together in such a manner that the pick-up portions thereof face the same tracks of each of the tapes of the cartridges 15*a*, 15*b* and 15*c*. For the example, when the pick-up portion of the reproducing head 29*b* faces the first and fifth tracks of the cartridge 15*b* for reproducing the first program, the pick-up portions of the other reproducing heads 29*a* and 29*c* respectively face the first and fifth tracks of the tapes within cartridges 15*a* and 15*c* for reproducing the first programs thereof. Similarly, when the pick-up portion of the reproducing head 29*b* faces the fourth and eight tracks of the cartridge 15*b* for reproducing the fourth program, the pick-up portions of the reproducing heads 29*a* and 29*c* respectively face the fourth and eighth tracks of the tapes within cartridges 15*a* and 15*c* for reproducing the fourth programs thereof.

Figure 5:
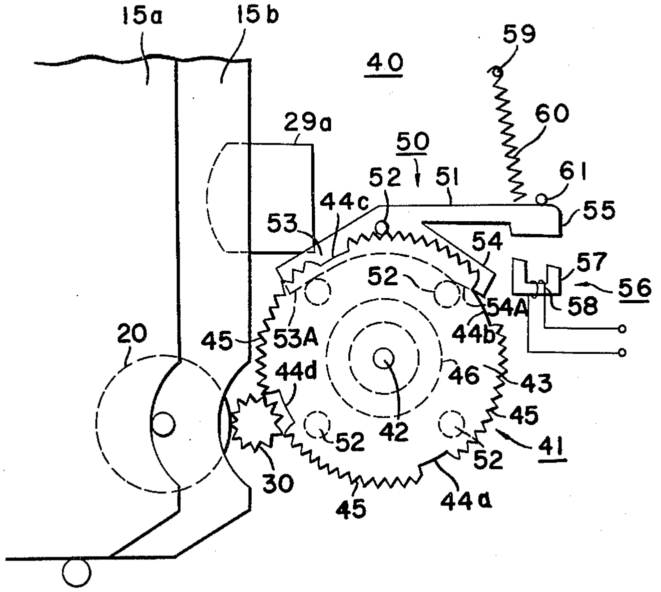
FIG. 5 is a plan view of the first control means of FIG. 1.
Figure 6:
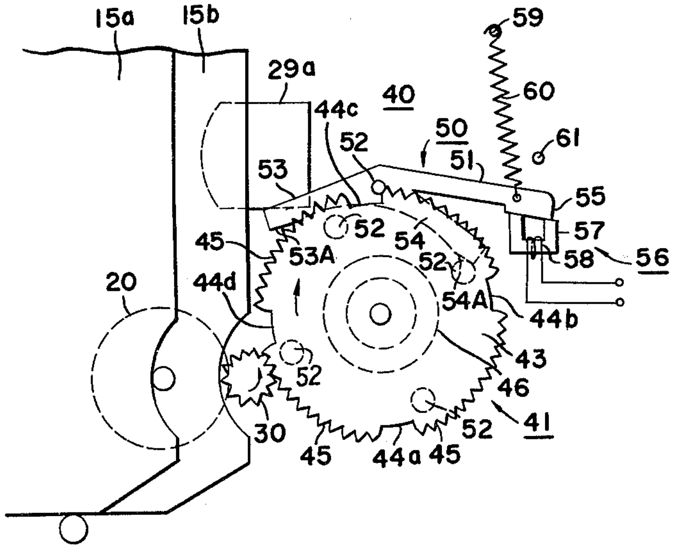
FIG. 6 is a plan view of the tape player showing the operation of the first control means of FIG. 5.

Referring now to FIGS. 1–6, the first control means 40 is disclosed in detail, FIGS. 5 and 6 clearly showing the control means 40, since plate 11 has been deleted. In order to drive the control means 40, a small pinion gear 30 is mounted upon the upper end of the capstan shaft 23 above the plate 11. The control means 40 consists substantially of a rotary element, generally indicated by the reference character 41, which is driven by the pinion gear 30, and an alerting means, generally indicated by the reference character 50, for controlling the connection of the pinion gear 30 and the rotary element 41. The rotary element 41 is disposed above plate 11 upon a rotatable shaft 42 which is inserted within the plate 11 and extends parallel to the capstan shaft 23.

The rotary element 41 includes a gear element 43 and a cam element 46 which is coaxially disposed upon shaft 42 below the gear element 43. The gear element 43 has four notched portions **44*a*, 44*b*, 44*c*, and 44*d* which are devoid of gear teeth thereby forming four separated gear portions 45 upon gear 43 which may interlock with the pinion gear 30. The four notched portions 44*a*, 44*b*, 44*c*, and 44*d* on the other hand operate to disconnect the pinion gear 30 from the gear element 43 when the particular notched portion of gear 43 faces pinion gear 30 whereby the rotary element 41 is placed in a static state. It is noted that the portions 44*a*, 44*b*, 44*c* and 44*d* are equidistantly spaced about element 43**.

The cam element 46 includes a cam surface 47, as particularly shown in FIG. 3, which in turn includes four surface portions **47*a* which are stepped with respect to each other, FIG. 3 disclosing two of the four stepped surfaces. The upper end of the connecting shaft 27 of the head assembly is in contact with the cam surface 47, such state being constantly maintained by means of coil spring 48 compressed between the head connecting element 28*c* and the plate 11**.

One of the four surface portions **47*a* of the cam surface 47 contacts the head connecting shaft 27 in such a manner that one of the notched portions 44*a*, 44*b*, 44*c*, and 44*d* faces the pinion gear 30, and in this manner, the rotary element 41 is placed in a static condition and the head connecting shaft 27 is likewise placed in one of four stable positions. The four stable positions correspond respectively to axial displacements of the head connecting shaft 27, the first position of the head connecting shaft 27 being attained when the notched portion 44*a* faces the pinion gear 30 whereby all of the reproducing heads 29*a*, 29*b* and 29*c* are positioned so that the first program may be reproduced. The second, third and fourth positions are respectively attained when the portions 44*b*, 44*c*, and 44*d* face the pinion gear 30, whereby all of the reproducing heads are positioned so as to reproduce the second, third or fourth programs, respectively. For example, FIG. 3 illustrates the condition wherein the portion 44*d* faces the pinion gear 30. It is noted here that when cartridges 15*a*, 15*b* and 15*c* having only two programs thereon are used, it is sufficient to provide two surfaces 47*a* upon the cam surface 47 and to provide two notched portions upon the gear element 43**.

The alerting means 50 is particularly shown in FIGS. 5 and 6, and substantially consists of an alert lever 51 which is rotatably mounted around a pivot pin 52 which is mounted within the plate 11. The lever 51 is made of magnetic material and in turn consists of a pair of alert arms 53 and 54 which extend away from the pin 52, and an operation arm 55.

The alert arms 53 and 54 are respectively interconnected and configured so as to form arcuate portions, a plane surface **53*a* being formed upon the radially inner portion of arm 53 and serving as a damping surface for the rotary element 41. Similarly, a plane surface 54*a* is formed upon the radially inner portion of arm 54 and serves as an alerting surface for the rotary element 41. An iron core 57 of an electromagnetic apparatus 56 faces the operation arm 55, the iron core 57 having a U-shaped configuration wherein both legs thereof face the operation arm 55 and being fixedly supported by plate 11. The coil 58 wound about the iron core 57 is actuated for a short period of time by means of an electrical output of a detector, not shown, for detecting the completion of the reproduction of each program by means of a sensing tape which is attached to the tapes of the cartridges 15*a* and 15*b*, whereby the operation arm 55 is attracted to core 57 so as to rotate the alerting lever 51 in a clockwide direction about pivot 52, as in FIGS. 5 and 6. The operation arm 55 normally abuts a stopper pin 61 under the biasing influence of a spring 60 which is provided between the operation arm 55 and a pin 59 and consequently, the alerting lever 51 is rotated in a clockwise direction against the biasing action of the spring when the coil 58** is actuated.

The rotary element 41 further comprises four pins 52 which are provided so as to control the operation of the rotary element 41 by means of the alerting means 50. The pins 52 respectively project from the lower surface of the gear element 43 and are equidistantly disposed upon element 43 for cooperating with the alert arms 53 and 54. FIG. 5 illustrates the stable condition wherein the portion **44*d* faces the pinion gear 30, while FIG. 6 illustrates the condition for alerting the first control means 40 from the condition shown in FIG. 5. In the stable condition shown in FIG. 5, the stopping or damping surface 53*a* contacts one of the pins 52 so as to stop or damp the rotation of the rotary element 41, especially in the clockwise direction. Similarly, the alerting surface 54*a* contacts one of the pins 52 so as to stop or damp the counter-clockwise rotation of the rotary element 41. In this condition, the operation arm 55 of the alerting lever 51 abuts the stopper pin 61 so that the first control means 40 is in a stable condition, and the reproducing heads 29*a*, 29*b*, and 29*c*** are held within the position corresponding to the fourth program.

When the coil 58 of the electomagnetic apparatus 56 is actuated, the alerting lever 51 is rotated clockwise as shown in FIG. 6. As a result, the contact between the stopping or damping surface **53*a* and the pin 52 is broken while the other pin 52 is projected by means of the alerting surface 54*a* so as to rotate the rotary element 41 in a clockwise direction. Accordingly, the gear portion 45 located between the notched portions 44*d* and 44*a* is rotated so as to become interlocked with the pinion gear 30. The coil 58 of the electromagnetic apparatus 56 is subsequently deactuated after the gear portion 45 has interlocked with the pinion gear 30 whereby the alerting lever 51 is returned to the normal position. The rotary element 41 is of course continuously rotated in a clockwise direction by means of the pinion gear 30 until the gear element 43 becomes disconnected from the pinion gear 30 due to the fact that the next notched portion 44*a* now faces the pinion gear 30**. When this occurs, the control means once again attains a stable condition, and stops. In this condition, the reproducing heads 29*a*, 29*b*, and 29*c* are held at their respective positions corresponding to the first program.

As stated above, the first control means 40 operates so as to rotate the rotary element 41 upon actuation of the electromagnetic apparatus 56 whereby the position of the reproducing heads 29*a*, 29*b*, and 29*c* are shifted. For example, when the cartridge 15*b* is placed in the reproducing position $P_2$ by means of the second control means 70, the four programs of the cartridge 15*b* are progressively reproduced by the operation of the first control means 40, the electromagnetic apparatus 56 being actuated upon completion of the reproduction of each program and the reproducing head being shifted to the position corresponding to the reproduction of the next program.

Referring now to FIGS. 1, 2, 4, 7, 8, and 9, the second control means 70 will be described in detail. The control means 70 comprises a gear mechanism generally indicated by the reference character 71, a cam mechanism generally indicated by the reference character 80, an operation mechanism generally indicated by the reference character 90, and an alerting mechanism generally indicated by the reference character 100. The gear mechanism 71 comprises a gear element 72 which is driven by the pinion gear 30 and which is mounted upon a shaft 73 which projects through the plate 11 and extends parallel to the capstan shaft 23. The gear element 72 is disposed above the plate 11 and comprises a first gear 74 interlocked with the pinion gear 30 and a second gear 76 integrally coaxially disposed with and below the first gear 74, the first gear 74 having one notched portion 75 upon the gear surface. A third gear 77 which is always interlocked with the second gear 76 is mounted upon the upper end of cam shaft 81 of the cam mechanism 80, the cam shaft 81 projecting through the plates 11 and 12 parallel to shaft 23 and being rotatably supported by the plates.

Figure 7:
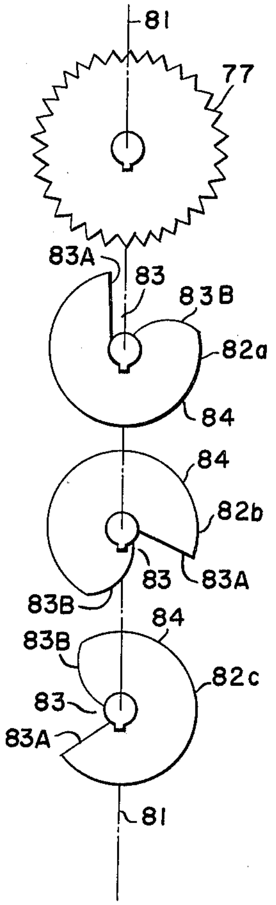
FIG. 7 is a schematic exploded view of the cam mechanism of the second control means.

Three cams 82*a*, 82*b*, and 82*c* are respectively mounted upon the cam shaft 81 in coaxial relation, FIG. 7 illustrating the cams in detail as well as their relative connections. As is clear from FIG. 7, all of cams 82*a*, 82*b*, and 82*c* have the same configuration and are respectively provided with a notched portion or cavity 83. The peripheral surface of the cams is designated as a cam surface 84. The portion 83 is formed with a radial cut surface 83*a* and a curved surface 83*b* which also extends substantially in the radial direction. The cams 82*a*, 82*b*, and 82*c* are respectively mounted upon the shaft 81 so as to circumferentially space the cut surfaces 83*a* 120° with respect to each other.

Figure 8:
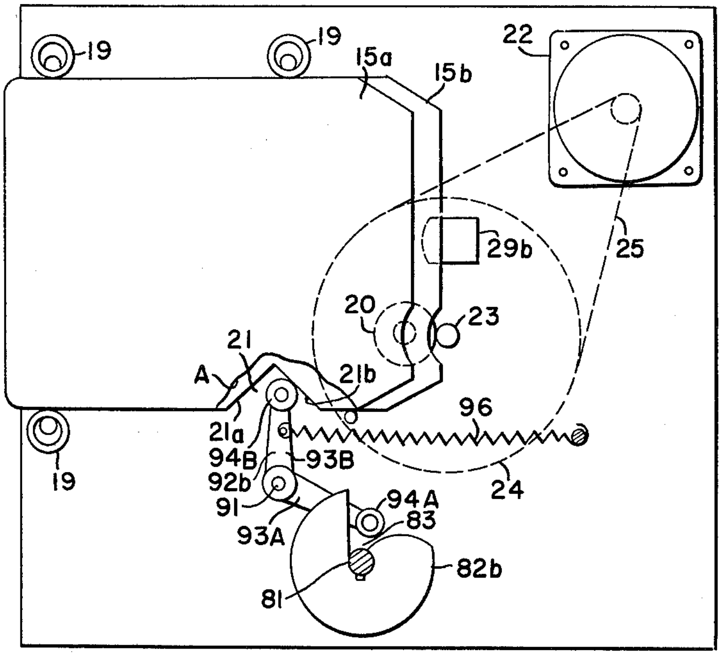
FIG. 8 is a plan view of the main portion of the second control means in a first position.
Figure 9:
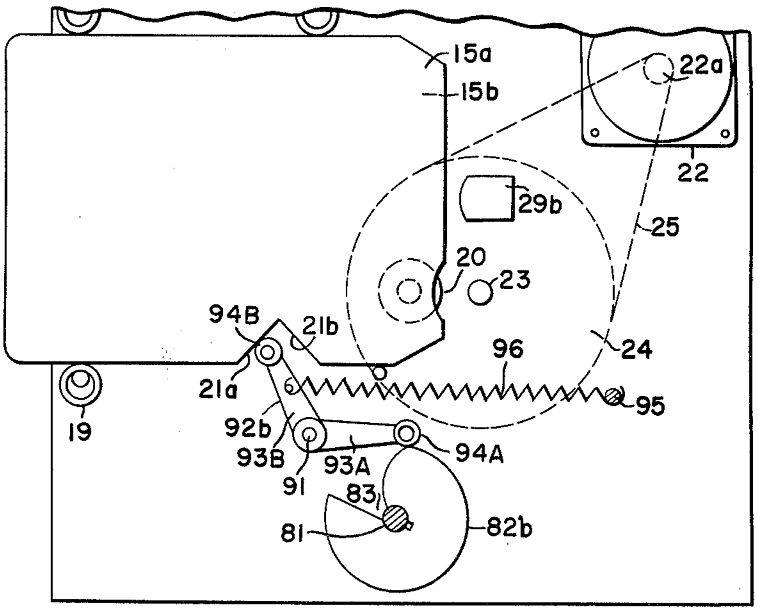
FIG. 9 is a plan view of the main portion of the second control means in another position.

Referring now to FIGS. 1, 3, 8 and 9, the operation mechanism 90 comprises a rod 91 mounted within and projecting through the plates 11 and 12 in a direction parallel to the capstan shaft 23. The operation elements 92*a*, 92*b*, and 92*c* are respectively and separately coaxially rotatably mounted upon the rod 91 and each of the elements has the same configuration and comprises arms 93*a* and 93*b* which are integrally formed together so as to maintain the angle therebetween constant, as seen in FIGS. 8 and 9. The arms 93*a* respectively contact the cam surface 84 of the cams 82*a*, 82*b*, and 82*c* while the arms 93*b* respectively contact the cavity surfaces 21*a* and 21*b* of the cartridges 15*a*, 15*b* and 15*c*. Contacting rollers 94*a* and 94*b* are respectively provided upon the ends of arms 93*a* and 93*b* and a spring 96 is provided between each of the arms 93*b* of the operation element and a pin 95, which is supported between plates 11 and 12, so as to maintain the same under tension whereby the contacting rollers 94*a* of the operation elements 92*a*, 92*b*, and 92*c* are respectively biased upon the cam surfaces 84 of the cams 82*a*, 82*b*, and 82*c*.

When the notched portion 75 of the first gear 74 faces the pinion gear 30, the second control means 70 is in a stable condition wherein the first gear 74 is of course disengaged from the pinion gear 30 by means of the portion 75, and consequently, the cams 82*a*, 82*b*, and 82*c* are disposed upon the shaft 81 whereby the contacting roller 94*a* of one of the arms 93*a* of the operation elements 92*a*, 92*b* and 92*c* is disposed within the cavity 83 of the corresponding cam. FIG. 8, for example, discloses the condition wherein the contacting roller 94*a* of the operation element 92*b* is within the cavity 83 of the corresponding cam 82*b*. In this condition, the operation element 92*b* is biased by means of the spring 96, whereby the contacting roller 94*b* abuts the contact surface 21*b* of the cavity 21 of the cartridge 15*b* so as to shift the cartridge 15*b* to the reproducing position $P_2$. In this condition, the program of the cartridge 15*b* is reproduced by the reproducing head 29*b*.

Figure 2:
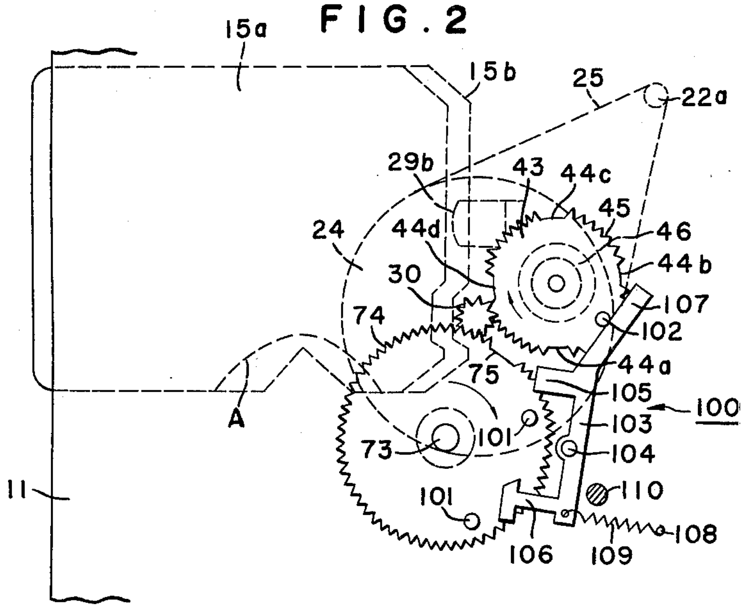
FIG. 2 is a plan view of the tape player showing the operation of the second control means of FIG. 1.

The alerting mechanism 100 for the second control means 70 is clearly shown in FIGS. 1 and 2. In order to facilitate cooperation with the mechanism 100, two pins 101 are disposed upon the upper surface of the first gear 74 and another pin 102 is similarly disposed upon the upper surface of the gear element 43 of the first control means 40, the two pins 101 being placed upon gear 74 at equal radial distances from axial shaft 73, while the pin 102 is placed upon the gear portion 45 between the portions 44*a* and 44*b*. The alerting mechanism 100 further comprises an alert lever 103 having a substantially F-shaped configuration and is rotatably supported upon a pin 104 which is supported upon the plate 11. The lever 103 in turn comprises a stop element 105 and an operation element 107 upon one side of the pin 104 and an alert element 106 upon the other side. A spring 109 is provided between the alert element 106 and a pin 108 so as to bias the lever 103 in a counterclockwise direction as seen in FIG. 1 whereby lever 103 contacts a stopper pin 110 which is supported within the plate 11.

The operation element 107 cooperates with the pin 102 and the stop element 105 and the alert element 106 cooperate with the pins 101. In the condition shown in FIG. 1, wherein the notched portion 75 of the first gear 74 faces the pinion gear 30, one of the pins 101 is contacted by the stop element 105 while the other pin 101 is similarly contacted by the alert element 106 so as to prevent rotation of the gear 74.

On the other hand, when the rotary element 41 is rotated in a clockwise direction as seen in FIG. 1, from the condition wherein the notched portion 44*d* faces the pinion gear 30 to the condition wherein the next portion 44*a* faces the pinion gear 30, the pin 102 contacts the operation element 107 so as to rotate the same and the alert lever 103 in a clockwise direction against the tension of the spring 109, as seen in FIG. 2. The stop element 105 is thus disengaged from the pin 101 due to the rotation of the lever 103 so as to allow rotation of the gear 74, and simultaneously, the alert element 106 momentarily acts as a cam upon the other pin 101 so as to initiate the clockwise rotation of the gear 74.

As a result, the pinion gear 30 is interlocked with the gear 74 so as to drive the same in a clockwise direction, until the notched portion 75 again faces the pinion gear 30. In this manner, the gear 74 is rotated one revolution from the condition shown in FIG. 1 so as to again place the second control means in the stable condition.

It will be noted that the cam shaft 81 is rotated in a counter-clockwise direction for a predetermined angular displacement, such as, for example, 120° or one-third of a revolution, through the gears 76 and 77 for every revolution of the gear 74, the angle of rotation of the cam shaft 81 of course being determined by the gear ratio of the gears 76 and 77. When three cartridges 15*a*, 15*b*, and 15*c* and three cams 82*a*, 82*b*, and 82*c* are employed, the gear ratio is set at 1 : 3, so that the cam shaft 81 is rotated one revolution when the gear 74 completes three revolutions.

In accordance with the rotation of the cam shaft 81, the contact roller 94*a* of the operation element 92*b* which was disposed within the cavity 83 of the cam 82*b* is now forced along the curved surface 83*b* of the cam 82*b* and the contact roller 94*b* of the operation element 92*b* contacts the contact surface 21*a* of the cavity 21 of the cartridge 15*b* so that the cartridge 15*b* is returned to the non-reproducing position $P_1$. The condition is similar to that shown in FIG. 9, and consequently, when the cam shaft 81 is rotated one-third revolution from the position shown in FIG. 1, the contact roller 94*a* of the operation element 92*c* is positioned within the cavity 83 of the next cam 82*c*, so that the cartridge 15*c* is now shifted to the reproducing position $P_2$.

In general, when N number of cartridges and cams are employed, the gear ratio of the gears 76 and 77 is set at 1 : N so that the cam shaft 81 is rotated 1/N revolution for every complete revolution of gear 74. The N number of cams are disposed upon the cam shaft 81 whereby the angular spacing of the surface 83*a* corresponds to 1/N revolution. As a result, the next cartridge is progressively shift to the reproducing position $P_2$ for every revolution of the gear 74, only one cartridge being positioned at the reproducing position $P_2$ at a particular time.

The pin 102 operates the second control means 70 only once while the roatry element 41 of the first control means 40 is rotated one revolution i.e., while shifting the reproducing heads 29*a*, 29*b* and 29*c* progressively through the first through the fourth positions. The pin 102 alerts the second control means 70 while shifting from the fourth position in which the portion 44*d* faces the pinion gear 30 to the first position in which the portion 44*a* faces the pinion gear 30.

In accordance with the embodiment, after reproducing the first, second, third and fourth programs of one cartridge, such as for example, 15*b*, the first program of the next cartridge 15*c* is reproduced. After reproducing all the programs of the cartridge 15*c*, the cartridge 15*a* is shifted to the reproducing position $P_2$ whereby the programs of the cartridge 15*a* will be reproduced.

It is possible to alert the alerting mechanism 100 of the second control means 70 by different electromagnetic apparatus without employing the pin 102 of the first control means 40. In this case, an electromagnetic apparatus for rotating the lever 103 of the alerting mechanism 100, in a clockwise direction, against the spring 109 is employed. The electromagnetic apparatus is similar to the electromagnetic apparatus 56 of the first control means 40, and when the electromagnetic apparatus is actuated for a short period of time after reproducing the first through the fourth programs of one cartridge, the continuous reproduction can be performed as in the above described embodiment. When the first control means 40 is deleted, the structure alerting the alerting mechanism 100 may be actuated by the electromagnetic apparatus.

Obviously, many modifications and variations of the present invention are possible in light of the above teachings. It is therefore to be understood, that within the scope of the appended claims, the present invention may be practiced otherwise than as specifically described herein.

What is claimed as new and desired to be secured by Letters Patent of the United States is:

1. A cartridge type tape player comprising:

at least one tape cartridge containing a tape having a plurality of tracks thereon;

at least one reproducing head disposed adjacent to said cartridge;

a capstan shaft driven by a driving means for moving the tape of said cartridge past said reproducing head and having a pinion gear rotatably mounted thereon;

first control means connectable with said capstan shaft and driven by said capstan shaft when connected with said capstan shaft for vertically shifting said reproducing head relative to said cartridge so as to achieve a track changing operation when a program upon a prior track of said tape has been completed;

second control means connectable with said capstan shaft and driven by said capstan shaft when connected with said capstan shaft for shifting said cartridge toward and away from said reproducing head to reproducing and non-reproducing stations for reproducing and storing said cartridge, respectively;

control element means for controlling said connections between said first and second control means and said capstan shaft;

at least one of said first and second control means comprising a gear element having a notched portion upon at least one portion of said gear which when disposed opposite said pinion gear defines a stable condition for said gear element and said first or second control means whereby said gear element and said at least one of said first or second control means is disconnected from said pinion gear and said capstan shaft and thereby inactivated and wherein the remainder of said gear element is formed with gear teeth which when disposed opposite said pinion gear, said gear element is in an activated condition as a result of being interlocked with and driven by said pinion gear whereby said at least one of said first and second control means may be activated, said control element means comprises a pivotable alert lever; and means mounting said alert lever between a first position and a second position, movement of said alert lever from said first position to said second position causing rotation of said gear element from said stable condition to said activated condition, as a result of which rotation, said teeth of said gear element become interlocked with said pinion gear.

2. A cartridge type tape player as set forth in claim 1, wherein said control element means comprises electromagnetic means for pivoting said alert lever.

3. A cartridge type tape player as set forth in claim 2, further comprising:

a plurality of cartridges each one of which contains a tape having a plurality of programs and a pinch roller, said capstan shaft being disposed adjacent to said pinch rollers; and a plurality of reproducing heads disposed adjacent to said cartridges, wherein said first control means is provided for shifting all of said reproducing heads to a position for reproducing one program of said cartridges when said first control means is connected to said pinion gear, and said second control means is provided for selectively shifting one cartridge of said plurality of cartridges to a reproducing position when said second control means is connected to said pinion gear, whereby said tape of said cartridge shifted to said reproducing position is moved by means of said pinch roller contacting said capstan shaft so as to reproduce said program by said corresponding reproducing head.

4. A cartridge type tape player as set forth in claim 3, wherein said reproducing heads are coaxially mounted upon a shaft and said first control means comprises cam means for progressively shifting said shaft and said reproducing heads while said one cartridge is retained within said reproducing position by said second control means whereby said programs of said one cartridge are progressively reproduced.

5. A cartridge type tape player as set forth in claim 3, wherein both of said first and second control means have respective gear elements having at least one notched portion formed therein which when disposed opposite said pinion gear defines stable conditions for said gear elements and said first and second control means whereby said gear elements and said first and second control means are disconnected from said pinion gear and said capstan shaft and thereby inactivated and wherein the remainder of said gear elements are formed with gear teeth which when disposed opposite said pinion gear, said gear elements are in an activated condition as a result of being interlocked with said pinion gear whereby said first control means shifts said reproducing heads by rotation of said respective gear element, and said second control means selectively shifts said cartridges to the reproducing position by rotation of said respective gear element.

6. A cartridge type tape player as set forth in claim 5, wherein said gear element of said first control means comprises a plurality of notched portions which are respectively spaced from each other, whereby said notched portions disconnect said first control means from said pinion gear when one of said notched portions faces said pinion gear so as to provide a stable position for reproducing the program upon said tape which is in contact with said reproducing head.

7. A cartridge type tape player as set forth in claim 6, wherein said first control means further comprises:

a pivotable alert mechanism; and means mounting said alert mechanism between a first position and a second position, movement of said alert mechanism from said first position to said second position causing rotation of said gear element of said first control means thereby interlocking said gear element of said first control means to said pinion gear after reproducing a program of said one cartridge so as to begin to rotate said gear element in a direction whereby the next notched portion of said gear element will face said pinion gear at which position another program of said one cartridge may be reproduced.

8. A cartridge type tape player as set forth in claim 6, wherein said gear element of said second control means includes one notched portion whereby said notched portion serves to disconnect said second control means from said pinion gear when said notched portion faces said pinion gear so as to maintain said one selected cartridge at the reproducing position.

9. A cartridge type tape player as set forth in claim 8, wherein said second control means comprises:

a pivotable alert mechanism;

means mounting said alert mechanism between a first position and a second position, movement of said alert mechanism from said first position to said second position causing rotation of said gear element of said second control means thereby interlocking said gear element of said second control means with said pinion gear after reproducing all of said programs of said one cartridge;

additional gear means rotatably mounted on a shaft and connected with said gear element of said second control means;

a plurality of cams coaxially mounted upon said gear shaft and circumferentially spaced from each other about said shaft; and a plurality of operation element arm means engaged with said cams and said cartridges for reciprocating said cartridges toward and away from said reproducing position in response to the rotary movement of said second control means gear element, said additional gear means, said shaft, and said cams, whereby said one cartridge may be removed from said reproducing position and another cartridge may be moved to said reproducing position.

10. A cartridge type tape player as set forth in claim 9 wherein said alert mechanism of said second control means is actuated by said first control means, whereby said cartridges are moved toward and away from said reproducing position in accordance with the movement of said reproducing heads so as to continuously and progressively reproduce the programs upon said tapes of said cartridges.

* * * * *